US008229662B2

(12) United States Patent
Subelet et al.

(10) Patent No.: US 8,229,662 B2
(45) Date of Patent: Jul. 24, 2012

(54) METHOD FOR PREDICTING COLLISIONS WITH OBSTACLES ON THE GROUND AND GENERATING WARNINGS, NOTABLY ON BOARD AN AIRCRAFT

(75) Inventors: Michel Subelet, Cugnaux (FR); Sylvain Fontaine, Villeneuve Tolosane (FR); Carine Moncourt, Pins Justaret (FR); Bernard Fabre, Fonsorbes (FR)

(73) Assignee: Thales (FR)

( * ) Notice: Subject to any disclaimer, the term of this patent is extended or adjusted under 35 U.S.C. 154(b) by 1050 days.

(21) Appl. No.: 12/092,897

(22) PCT Filed: Nov. 6, 2006

(86) PCT No.: PCT/EP2006/068151

§ 371 (c)(1), (2), (4) Date: May 7, 2008

(87) PCT Pub. No.: WO2007/054482

PCT Pub. Date: May 18, 2007

(65) Prior Publication Data

US 2008/0319671 A1 Dec. 25, 2008

(30) Foreign Application Priority Data

Nov. 10, 2005 (FR) ...................................... 05 11465

(51) Int. Cl.
*G01S 13/00* (2006.01)
*G06F 17/10* (2006.01)

(52) U.S. Cl. .......................................... 701/301; 342/63

(58) Field of Classification Search .................. 701/1, 3, 701/4, 9, 17, 300, 301; 342/29–32, 63
See application file for complete search history.

(56) References Cited

U.S. PATENT DOCUMENTS 5,442,556 A * 8/1995 Boyes et al. ...................... 701/9
5,448,233 A * 9/1995 Saban et al. .................. 340/963
6,021,374 A 2/2000 Wood
6,577,947 B1 * 6/2003 Kronfeld et al. .............. 701/528

FOREIGN PATENT DOCUMENTS

FR 2607948 A1 6/1988
FR 9800207 A1 7/1999

* cited by examiner

*Primary Examiner* — James Trammel
*Assistant Examiner* — Muhammad Shafi
(74) *Attorney, Agent, or Firm* — Lowe Hauptman Ham & Berner, LLP

(57) ABSTRACT

The invention notably relates to a method of detecting obstacles on the ground receiving an obstacle clearance sensor and a zone for extracting map data. The method comprises the following steps:

extraction from an obstacle database of a list of pointlike obstacles;

extraction from an obstacle database of a list of linear obstacles;

determination, according to the obstacle clearance sensor, of the risks associated with the extracted pointlike obstacles and generation of a warning;

determination, according to the obstacle clearance sensor, of the risks associated with the extracted linear obstacles, and generation of a warning.

In particular, the invention applies to the calculation of the warnings relating to the risks of collision with pointlike or linear obstacles taking into account the path of the aircraft and the altitude of the obstacles.

11 Claims, 7 Drawing Sheets

METHOD FOR PREDICTING COLLISIONS WITH OBSTACLES ON THE GROUND AND GENERATING WARNINGS, NOTABLY ON BOARD AN AIRCRAFT

CROSS-REFERENCE TO RELATED APPLICATIONS

The present Application is based on International Application No. PCT/EP2006/068151, filed on Nov. 6, 2006, which in turn corresponds to French Application No. 05 11465 filed on Nov. 10, 2005, and priority is hereby claimed under 35 USC §119 based on these applications. Each of these applications are hereby incorporated by reference in their entirety into the present application.

FIELD OF THE INVENTION

The invention notably relates to a method of detecting obstacles on the ground. In particular, the invention applies to the calculation of the warnings relating to the risks of collision with pointlike or linear obstacles taking into account the path of the aircraft and the altitude of the obstacles.

BACKGROUND OF THE INVENTION

The aircraft are provided with numerous instruments aiming notably to limit the risks of accidents. There is a category of accidents designated by the expression Controlled Flight Into Terrain (CFIT). This category includes accidents during which an aircraft that can be flown under the control of its crew unintentionally strikes the relief, obstacles or a sheet of water without the crew being aware of the imminence of the collision.

To limit the risk associated with controlled flight into terrain accidents, new monitoring instruments have been developed. Notable among these is the terrain awareness and warning system. This system notably comprises a topographical database on the relief of the terrains.

However, the terrain awareness and warning systems do not have a function for predicting collisions with obstacles, such as, for example, man-made obstacles like electricity lines or even very high constructions. Needless to say, taking these obstacles into account would make it possible to very significantly improve the surveillance on the ground, particularly in the take-off and landing phases.

Taking obstacles into account in a terrain awareness and warning system comes up against the difficulty of having to potentially deal with a particularly high number of obstacles in certain geographic zones. Furthermore, the accuracy of the topographic data for the obstacles can vary widely from one information source to another, which makes the job of calculating the warnings complex. The multitude of obstacles and the variability of the level of accuracy of the coordinates of an obstacle raises a risk of triggering false alarms prejudicial to keeping the crew correctly informed.

SUMMARY OF THE INVENTION

A notable aim of the invention is to overcome the above-mentioned drawbacks. To this end, the subject of the invention is a method of predicting collisions with obstacles on the ground and generating warnings, receiving as input at least one obstacle clearance sensor and a zone for extracting map data. The method comprises the following steps:

- extraction, from an obstacle database, of a list of pointlike obstacles, the list of pointlike obstacles comprising, for each pointlike obstacle, the horizontal distance separating the pointlike obstacle from the current position of the aircraft, the horizontal accuracy and the height of the pointlike obstacle;
- extraction, from an obstacle database, of a list of linear obstacles, the list of linear obstacles comprising, for each linear obstacle, a list of pointlike obstacles corresponding to each end of the linear obstacle;
- determination, according to the obstacle clearance sensor, of the risks associated with the extracted pointlike obstacles and generation of a warning;
- determination, according to the obstacle clearance sensor, of the risks associated with the extracted linear obstacles and generation of a warning.

Advantageously, a pointlike obstacle is extracted from the obstacle database on one of the following conditions:

- the coordinates of said pointlike obstacle are within the extraction zone;
- at least a part of the area of uncertainty of said pointlike obstacle belongs to the extraction zone.

Advantageously, a linear obstacle is extracted from the obstacle database on one of the following conditions:

- the coordinates of each of the ends of said linear obstacle is included in the extraction zone;
- said linear obstacle intersects the extraction zone.

In one embodiment, the method comprises a filtering step generating a list of obstacles including all the extracted linear and pointlike obstacles on condition that their height is higher than the lowest point of the obstacle clearance sensor received from the input taking into account the level of accuracy of the measurement.

In one embodiment, to determine the risks associated with the extracted pointlike obstacles and to generate warnings, the following steps are carried out for each pointlike obstacle:

- extraction of the information relating to the pointlike obstacle;
- calculation of the distance d between the current position of the aircraft and the point whose coordinates are those of the pointlike obstacle;
- calculation of the minimum distance d−ha between the current position of the aircraft and the point whose coordinates are those of the pointlike obstacle notably taking into account the horizontal accuracy;
- calculation of the maximum distance d+ha between the current position of the aircraft and the point whose coordinates are those of the pointlike obstacle, notably taking into account the horizontal accuracy;
- calculation of the vertical distance between the pointlike obstacle and each point contained in the obstacle clearance sensor;
- calculation, from the vertical distance obtained, of the warning level that may need to be triggered according to a set of criteria.

In one embodiment, to determine the risks associated with the extracted linear obstacles and generate warnings, the following steps are carried out for each linear obstacle:

- extraction of the information relating to the linear obstacle;
- processing of the ends of the linear obstacle by the method of generating warnings for pointlike obstacles;
- calculation, if no warning is triggered in the preceding processing step, of a point P whose altitude is less than that of the other points of the obstacle clearance sensor, and of the distance d(P) between the position of the aircraft and the point P;
- calculation of the distance d(E1) between the position of the aircraft and the point whose coordinates are those of one of the ends of the linear obstacle;

calculation of the distance d(E2) between the position of the aircraft and the point whose coordinates are those of another of the ends of the linear obstacle;

determination that the distance d(P) belongs to the range [d(E1),d(E2)]:

if the distance d(P) is not included in the range [d(E1), d(E2)], the method is resumed at a step for calculating a point Δ;

if the distance d(P) is included in the range [d(E1),d (E2)], the method goes on to a comparison step;

comparison of the altitude of the obstacle clearance sensor with the distance d(P) and the altitude of the linear obstacle, then calculation, based on the comparison, of the warning level that may need to be triggered according to a set of criteria;

calculation of a point Δ corresponding to the point of intersection between the segment defined by two ends (E1, E2) of the pointlike obstacle and the straight line, passing through the position of the aircraft, perpendicular to the segment defined by two ends (E1, E2) of the pointlike obstacle;

verification that the point Δ belongs to the segment defined by two ends (E1, E2) of the pointlike obstacle and verification that the distance d(P) belongs to the range [d(Δ); d(E1)], d(Δ) representing the distance between the position of the aircraft and the point Δ;

if the verification step is positive, comparison of the altitude of the obstacle clearance sensor with the distance d(P) and the altitude of the linear obstacle, then calculation, based on the comparison, of the warning level that may need to be triggered according to the set of criteria.

Notable advantages of the invention are that it is particularly optimized in terms of efficiency for integration in existing onboard computers. Furthermore, it makes it possible to take into account all obstacles, regardless of the level of accuracy of the coordinates of the obstacles (from 10 feet to an unknown level). The invention can also be integrated in a terrain awareness and warning system.

Still other objects and advantages of the present invention will become readily apparent to those skilled in the are from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
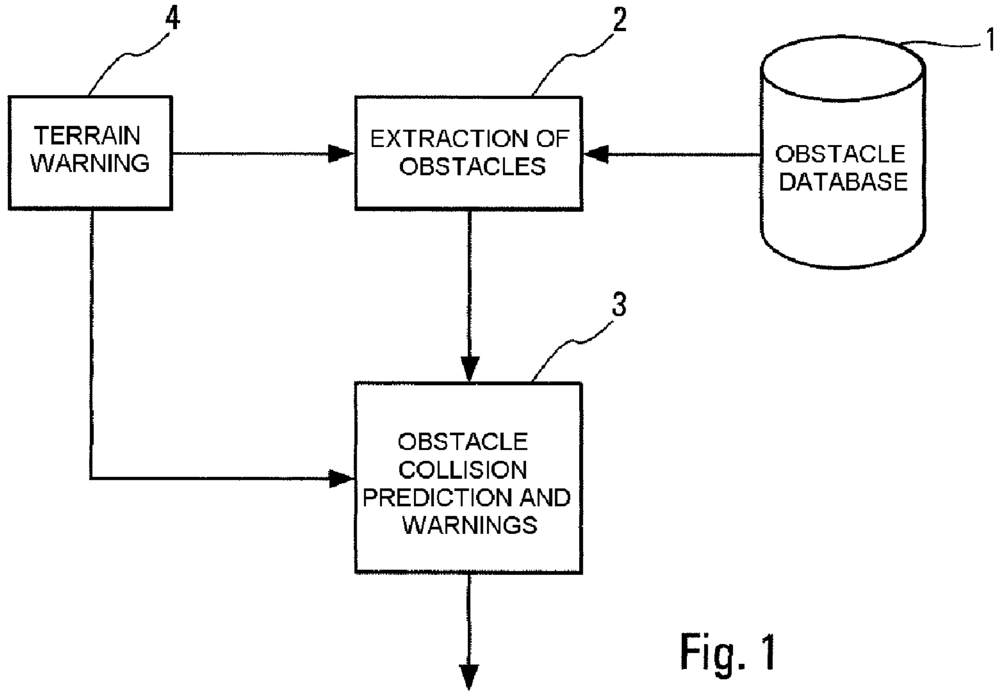
FIG. 1, an obstacle collision prediction and warning system according to the invention using data from an obstacle database coupled with a terrain awareness and warning system.

FIG. 1 illustrates an obstacle collision prediction and warning system according to the invention that uses data from an obstacle database coupled with a terrain awareness and warning system.

A terrain awareness and warning system is an instrument that can be installed onboard an aircraft. It notably comprises an onboard topographical terrain relief database. The topographical database of the obstacles can notably complement the existing data contained in the topographical terrain relief database.

In FIG. 1, a terrain warning device 4, normally included in a terrain awareness and warning system, sends a set of parameters to an obstacle extraction device 2. The terrain warning device 4 notably sends an obstacle clearance sensor and a map data extraction zone. The obstacle clearance sensor represents the altitude of the aircraft predicted over a short period (normally less than a minute). The obstacle clearance sensor notably comprises a table associating with each distance sample relative to the aircraft its predicted altitude. The obstacle clearance sensor is calculated at a frequency dependent on the flight parameters of the aircraft such as its speed, its altitude or even its rate of climb. The map data extraction zone is linked to the obstacle clearance sensor. In practice, the geographic extraction zone corresponds to the region concerned in the horizontal plane where the aircraft is likely to be in the short term. The parameters sent by the warning device 4 notably enable the obstacle extraction device 2 to extract from an obstacle database 1 the topographical data concerning obstacles present in the extraction zone according to the flight parameters of the aircraft. The obstacle collision prediction and warning device 3 receives the data extracted from the obstacle database 1 and the data transmitted by the terrain warning device 4. A notable function of the obstacle collision prediction and warning device 3 is to calculate the potential collisions of the aircraft with one or more obstacles according to the flight parameters of the aircraft and, where appropriate, trigger warnings. More particularly, the obstacle collision prediction and warning device 3 generates a warning in the following situations that can culminate in a controlled flight into terrain accident:

rate of descent of the aircraft that is dangerous in relation to the obstacles present in its environment;

rate of proximity of the aircraft that is dangerous in relation to the obstacles in its environment;

risky situation on a maneuver of the aircraft in relation to the obstacles present in its environment.

An obstacle can be a so-called pointlike obstacle if it is restricted to a limited geographic zone. A pointlike obstacle can be described notably by its latitude, its longitude and its height, for example an above mean sea level height. To this can be added the accuracy of each of its coordinates and, where appropriate, its horizontal extension. An area of uncertainty corresponds to a disk centered on a pointlike obstacle of a radius equal to the value of the uncertainty concerning the longitude and latitude coordinates of the obstacle. Of course, the parameters used to characterize an obstacle depend on the data available for each of the obstacles. An obstacle can even be a so-called linear obstacle if it extends over a large geographic zone. The ends of a linear obstacle can be represented by pointlike obstacles.

Figure 2A:
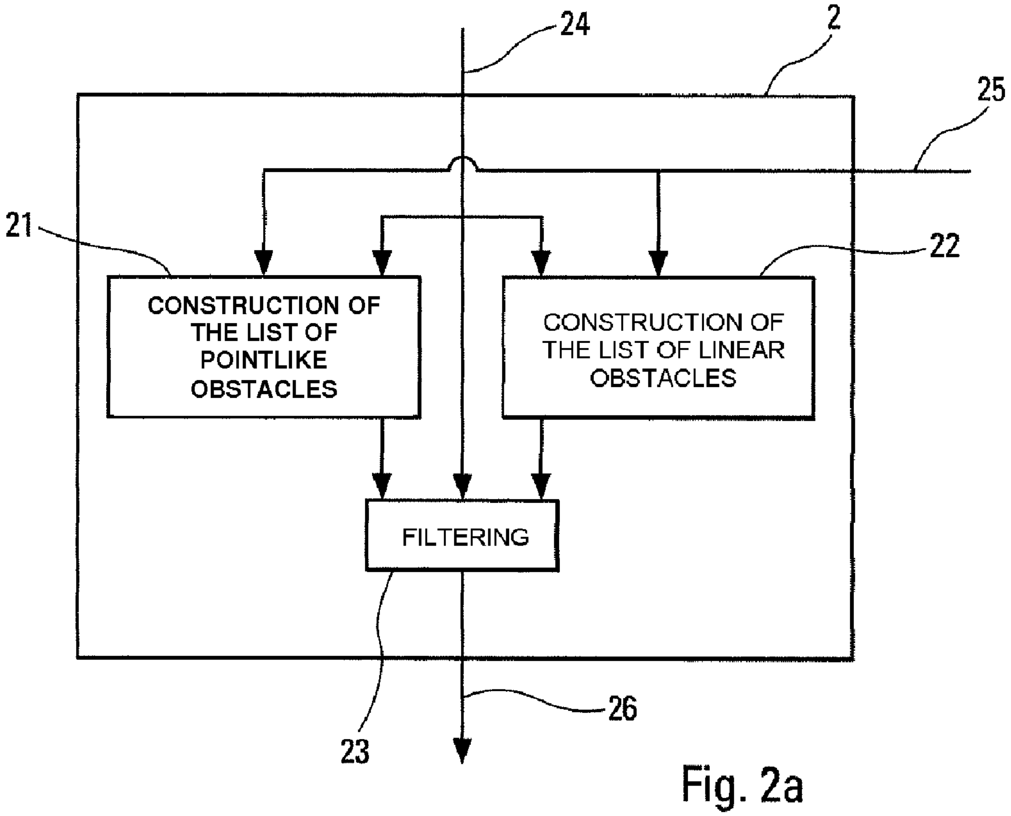
FIG. 2*a*, a method of extracting obstacles according to the invention that can be implemented in an obstacle extraction device.

FIG. 2*a* shows a method of extracting obstacles according to the invention that can be implemented in an obstacle extraction device. The elements that are identical to elements already presented are given the same references. The object of the method of extracting obstacles according to the invention is to generate a list of obstacles 26 that are relevant in light of the flight parameters of the aircraft. The method of extracting obstacles according to the invention notably receives as input 24 an object clearance sensor and a map data extraction zone. This information can notably be calculated and supplied by an existing terrain awareness and warning system. The method of extracting obstacles according to the invention has access to an obstacle database 1 via a connection 25.

Figure 2B:
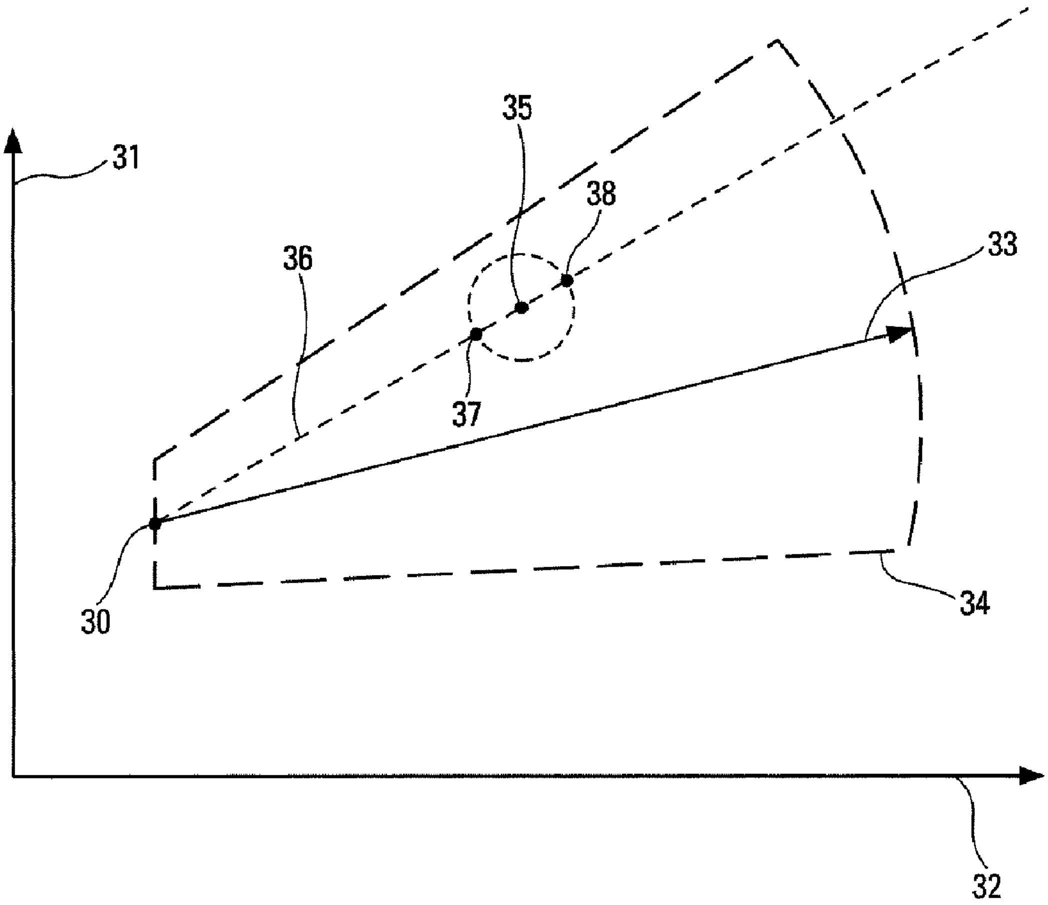
FIG. 2*b*, the case where a pointlike obstacle is included in the extraction zone.
Figure 2C:
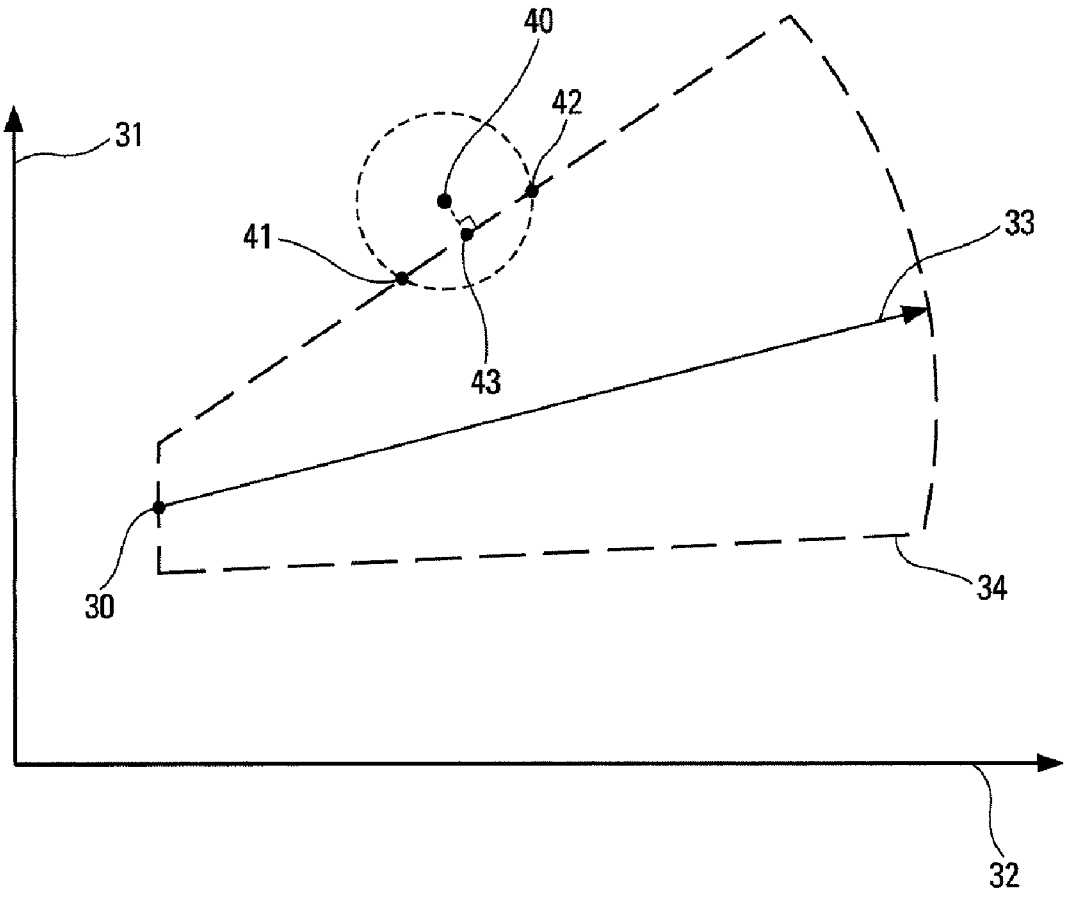
FIG. 2*c*, the case where a pointlike obstacle is not included in the extraction zone, but at least a part of its area of uncertainty belongs to the extraction zone.

In a step 21 of the method of extracting obstacles according to the invention, a list of pointlike obstacles is generated. The list of pointlike obstacles that are relevant in light of the flight parameters of the airplane and of the extraction zone received via the input 24 is extracted via a query over the connection 25 addressed to the obstacle database. The list of pointlike obstacles that is constructed notably includes, for each pointlike obstacle, the horizontal distance separating the pointlike obstacle from the current position of the aircraft, the horizontal accuracy and the height of the pointlike obstacle. A pointlike obstacle present in the environment of the aircraft is included in the list of pointlike obstacles provided that its coordinates are:

included in the extraction zone received via the input 24, the case illustrated by FIG. 2*b;* not included in the extraction zone, but at least a part of its area of uncertainty belongs to the extraction zone, as in the case illustrated by FIG. 2*c*.

FIG. 2*b* illustrates the case where a pointlike obstacle is included in the extraction zone. The elements that are identical to elements already presented are given the same references. FIG. 2*b* comprises a diagram, the X axis 32 of which represents the longitude and the Y axis 31 of which represents the latitude. The diagram represents, at a given instant, a position of the aircraft 30 from which is calculated the predicted path 33 of the aircraft over a short period comparable to that of the obstacle clearance sensor (typically less than a minute). An extraction zone 34 represents the zone on which the obstacles must be extracted. A pointlike obstacle 35 is included in the extraction zone 34. Since the pointlike obstacle 35 is included in the extraction zone, the latter is therefore included in the list of pointlike obstacles. The list of pointlike obstacles notably includes the distance between the position of the aircraft 30 and the pointlike obstacle 35, and the horizontal accuracy and the height of the pointlike obstacle 35. The horizontal accuracy makes it possible to calculate the area of uncertainty of the pointlike obstacle 35. The area of uncertainty of the pointlike obstacle 35 corresponds to the disk centered on the pointlike obstacle 35 of a radius equal to the value of the horizontal uncertainty. A straight line 36 passing through the position of the aircraft 30 and the pointlike obstacle 35 cuts the perimeter of the area of uncertainty of the pointlike obstacle 35 at two points. The point of intersection closest in distance to the position of the aircraft 30 is the point 37, and the point of intersection furthest away in distance is the point 38. Given notably the horizontal accuracy, it is therefore also possible to determine:

the minimum distance between the position of the aircraft 30 and the pointlike obstacle 35 corresponding to the distance between the position of the aircraft 30 and the point 37;

the maximum distance between the position of the aircraft 30 and the pointlike obstacle 35 corresponding to the distance between the position of the aircraft 30 and the point 38.

FIG. 2*c* illustrates the case where a pointlike obstacle is not included in the extraction zone, but at least a part of its area of uncertainty belongs to the extraction zone. The elements that are identical to elements already presented are given the same references. A pointlike obstacle 40 is not included in the extraction zone 34. However, the area of uncertainty of the pointlike obstacle 40 is at least partly included in the extraction zone 34, so the latter is included in the list of pointlike obstacles. A projected position 43 of the pointlike obstacle 40 is obtained by perpendicularly projecting the position of the pointlike obstacle 40 over the extraction zone 34. The list of pointlike obstacles notably includes the distance between the position of the aircraft 30 and the projected position 43 of the pointlike obstacle 40, and the horizontal accuracy and the height of the pointlike obstacle 40. The horizontal accuracy makes it possible to calculate the area of uncertainty of the pointlike obstacle 40. The area of uncertainty of the pointlike obstacle 40 corresponds to the disk centered on the pointlike obstacle 40 of a radius equal to the value of the horizontal uncertainty. The area of uncertainty of the pointlike obstacle 40 cuts into the extraction zone 34 at two points. The point of intersection that is closest in distance to the position of the aircraft 30 is the point 41, and the point of intersection furthest away in distance is the point 42. Given notably the horizontal accuracy, it is therefore also possible to determine:

the minimum distance between the position of the aircraft 30 and the pointlike obstacle 40 corresponding to the distance between the position of the aircraft 30 and the point 41;

the maximum distance between the position of the aircraft 30 and the pointlike obstacle 40 corresponding to the distance between the position of the aircraft 30 and the point 42.

Figure 2D:
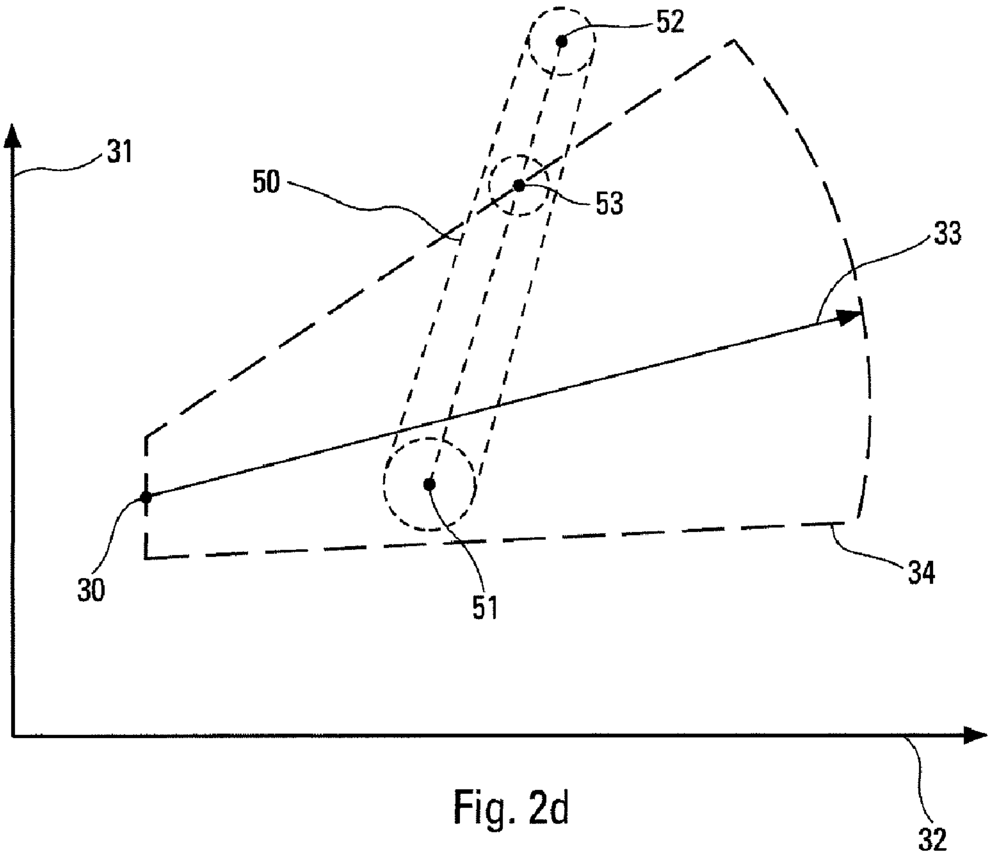
FIG. 2*d*, the case where at least one of the ends of a linear obstacle is not included in the extraction zone, but the linear obstacle intersects the extraction zone.

In FIG. 2*a*, in a step 22 of the method of extracting obstacles according to the invention, a list of linear obstacles is generated. The list of linear obstacles that are relevant in light of the flight parameters of the airplane and of the extraction zone received via the input 24 is extracted via a query addressed to the obstacle database over the connection 25. The list of linear obstacles that is constructed notably includes, for each linear obstacle, a list of pointlike obstacles corresponding to each end of the linear obstacle. In order to simplify the calculations, it can be assumed that the height of a linear obstacle is equal to the maximum height of its ends. A linear obstacle present in the environment of the aircraft is included in the list of linear obstacles, provided that:

- the coordinates of each of its ends are included in the extraction zone received via the input 24;
- the coordinates of at least one of its ends are not included in the extraction zone, but the linear obstacle intersects the extraction zone, as in the case illustrated by FIG. 2*d*.

In the case where the coordinates of each end of the linear obstacle are included in the extraction zone, the two ends, represented by two pointlike obstacles, can be treated in a way similar to pointlike obstacles. The linear obstacle is included in the list of linear obstacles.

FIG. 2*d* illustrates the case where at least one of the ends of a linear obstacle is not included in the extraction zone, but the linear obstacle intersects the extraction zone. The elements that are identical to elements already presented are given the same references. A linear obstacle 50 comprises two ends represented by a pointlike obstacle 51 and a pointlike obstacle 52. The pointlike obstacle 51 is included in the extraction zone 34. The linear obstacle 50 is therefore added to the list of the linear obstacles and the pointlike obstacle 51 is referenced as one of its ends. The pointlike obstacle 52 is not included in the extraction zone 34. A new pointlike obstacle 53 is therefore created. The coordinates of the obstacle 53 are the point of intersection of the linear obstacle 50 with the extraction zone 34, the point of intersection corresponding to the point of intersection closest in distance to the pointlike obstacle 52. The horizontal accuracy of the pointlike obstacle 53 is equal to that of the pointlike obstacle 52. Similarly, the height of the pointlike obstacle 53 is equal to that of the pointlike obstacle 52. The pointlike obstacle 53 is referenced like the other end of the linear obstacle 50. In one embodiment, a reference to the pointlike obstacle 52 is retained in the list of linear obstacles making it possible to find the origin ends of the linear obstacle 50. The two ends of the linear obstacle 50, represented by two pointlike obstacles 51 and 53, can be treated in a way similar to pointlike obstacles. The linear obstacle 50 is included in the list of linear obstacles.

In one embodiment, in FIG. 2*a*, a filtering step 23 can notably be added. The filtering step 23 notably receives as input the list of pointlike obstacles generated in the step 21 and the list of linear obstacles generated in the step 22. The filtering step 23 generates the list of obstacles 26 comprising all the linear and pointlike obstacles included in the obstacle lists generated in the steps 21 and 22, provided that their height is higher than the lowest point of the obstacle clearance sensor received from the input 24. The height for the filtering can be expressed as above mean sea level height, taking into account the level of accuracy of the measurement. It is, for example, desirable to take the most pessimistic case.

Figure 3A:
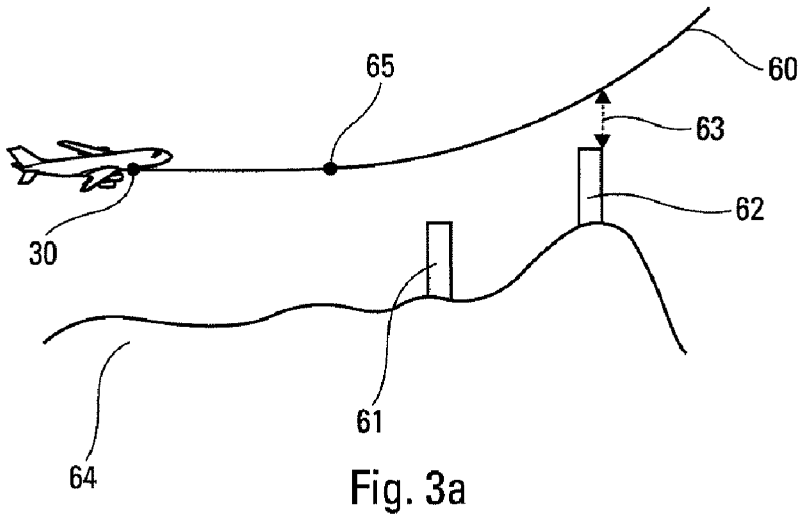
FIG. 3*a*, a situation where a warning relating to an obstacle must be generated.
Figure 3B:
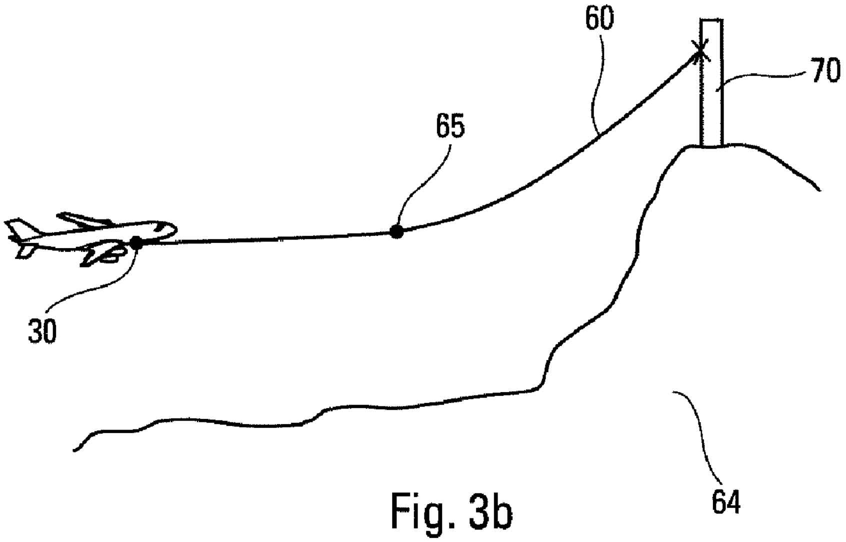
FIG. 3*b*, a situation where a obstacle avoidance warning must be generated.

FIGS. 3*a* and 3*b* show examples where the presence of an obstacle needs to trigger the generation of a warning.

The obstacle collision prediction and warning method according to the invention, implemented, for example, in an obstacle collision prediction and warning device 3 according to the invention represented in FIG. 1, can generate various warnings according to:

- the level of risks of the current situation of the aircraft, and
- a minimum obstacle clearance distance, defined as the vertical safety distance between the aircraft and an obstacle. This distance is notably chosen according to the characteristics of the aircraft and currently applicable standards.

The generated warnings can, for example, be divided into three categories:

- caution concerning an obstacle (or Obstacle Caution);
- warning concerning an obstacle (or Obstacle Warning);
- warning to avoid an obstacle (or Avoid Obstacle).

The obstacle caution is a warning triggered when the crew needs to be informed of a rate of proximity that is dangerous in relation to an obstacle. When a warning of this category is triggered, the crew must check the path of the aircraft and correct it if necessary. In case of doubt, a maneuver to gain altitude must be carried out by the crew until the warning ceases. This warning category is generated when the long term obstacle clearance sensor (that is, an obstacle clearance sensor with a horizontal distance relative to the aircraft that is higher than a predetermined threshold) is positioned for at least one obstacle at a vertical distance less than the minimum obstacle clearance distance. This warning category may not be generated if one or more warnings relating to an obstacle are generated.

FIG. 3*a* illustrates a situation where a warning relating to an obstacle must be generated. The elements that are identical to elements already presented are given the same references. From the position of the aircraft 30, a short term predicted path 60 of the aircraft is defined, that is, an obstacle clearance sensor with a horizontal distance relative to the aircraft less than a predetermined threshold 65. In a terrain 64, an obstacle 61 does not present a particular risk to the aircraft. No warning is triggered. An obstacle 62 presents a danger to the aircraft. In practice, the short term predicted path 60 of the aircraft is positioned relative to an obstacle 62 at a vertical distance 63 less than the minimum obstacle clearance distance. In this situation, corresponding to the case where a maneuver for gaining altitude must be carried out by the crew immediately to avoid any collision with an obstacle. In the case presented in FIG. 3*a*, an obstacle warning must be generated.

FIG. 3*b* illustrates a situation where an avoid obstacle warning must be generated. The elements identical to the elements already presented are given the same references. In the terrain 64, an obstacle 70 presents a danger to the aircraft. In practice, the short term predicted path 60 of the aircraft intersects the obstacle 70. This situation, corresponding to the case where the current path of the aircraft is dangerous because of the presence of an obstacle which cannot be avoided by a maneuver for gaining altitude given the current capabilities of the aircraft. An appropriate maneuver must be carried out by the crew immediately to avoid any collision with an obstacle. This situation can notably occur in the landing phases requiring maneuvers at a short distance from the relief, not allowing for standard maneuvers to gain altitude. In the case presented in FIG. 3*b*, an avoid obstacle warning must be generated.

Figure 4:
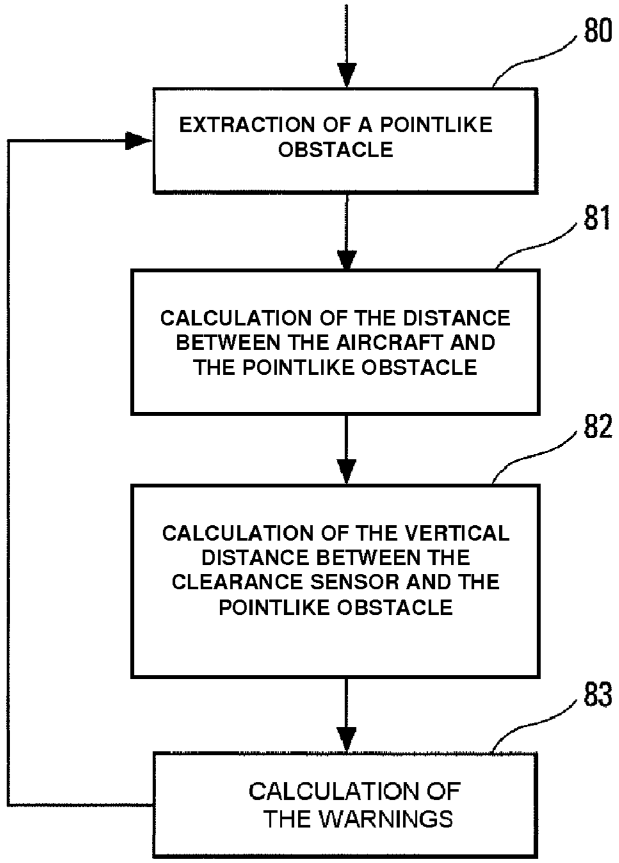
FIG. 4, a method of generating warnings for pointlike obstacles according to the invention that can be implemented in an obstacle collision prediction and warning device.

FIG. 4 shows a method of generating warnings for pointlike obstacles according to the invention that can be implemented in an obstacle collision prediction and warning device 3. The elements that are identical to elements already presented are given the same references. The method notably receives the predicted path 60 of the aircraft and the list of obstacles 26, which can notably be generated by the method of extracting obstacles according to the invention presented in FIG. 2*a*. In a step 80, the information relating to a pointlike obstacle is extracted from the list of obstacles 26 before being used to determine, in a step 81:

- the distance d between the current position of the aircraft 30 and the point whose coordinates are those of the pointlike obstacle;
- the minimum distance d–ha between the current position of the aircraft 30 and the point whose coordinates are those of the pointlike obstacle taking into account notably the horizontal accuracy (which corresponds to the point 37 in FIG. 2*b* or even 42 in FIG. 2*c*);

the maximum distance d+ha between the current position of the aircraft 30 and the point whose coordinates are those of the pointlike obstacle taking into account notably the horizontal accuracy (which corresponds to the point 38 in FIG. 2*b* or even 42 in FIG. 2*c*).

At the end of the step 81, a range [d−ha,d+ha] is therefore obtained, in which the real distance between the aircraft 30 and the pointlike obstacle is included. Then, in a step 82, the vertical distance between the pointlike obstacle and each point included in the predicted path 60 of the aircraft is calculated. For this, the range [d−ha,d+ha] is sampled at a frequency more or less equivalent to that used by the obstacle clearance. For each point of the range, the difference between the elevation of the corresponding point included in the obstacle clearance sensor 60 and the height of the obstacle is calculated. The smallest value obtained is the vertical distance between the pointlike obstacle and each point included in the obstacle clearance sensor 60. In a step 83, the vertical distance obtained is used to calculate the possible warning level to be triggered according to the criteria presented previously. As long as there remain pointlike obstacles in the list of obstacles 26, all the steps described in FIG. 4 are restarted at the step 80.

Figure 5A:
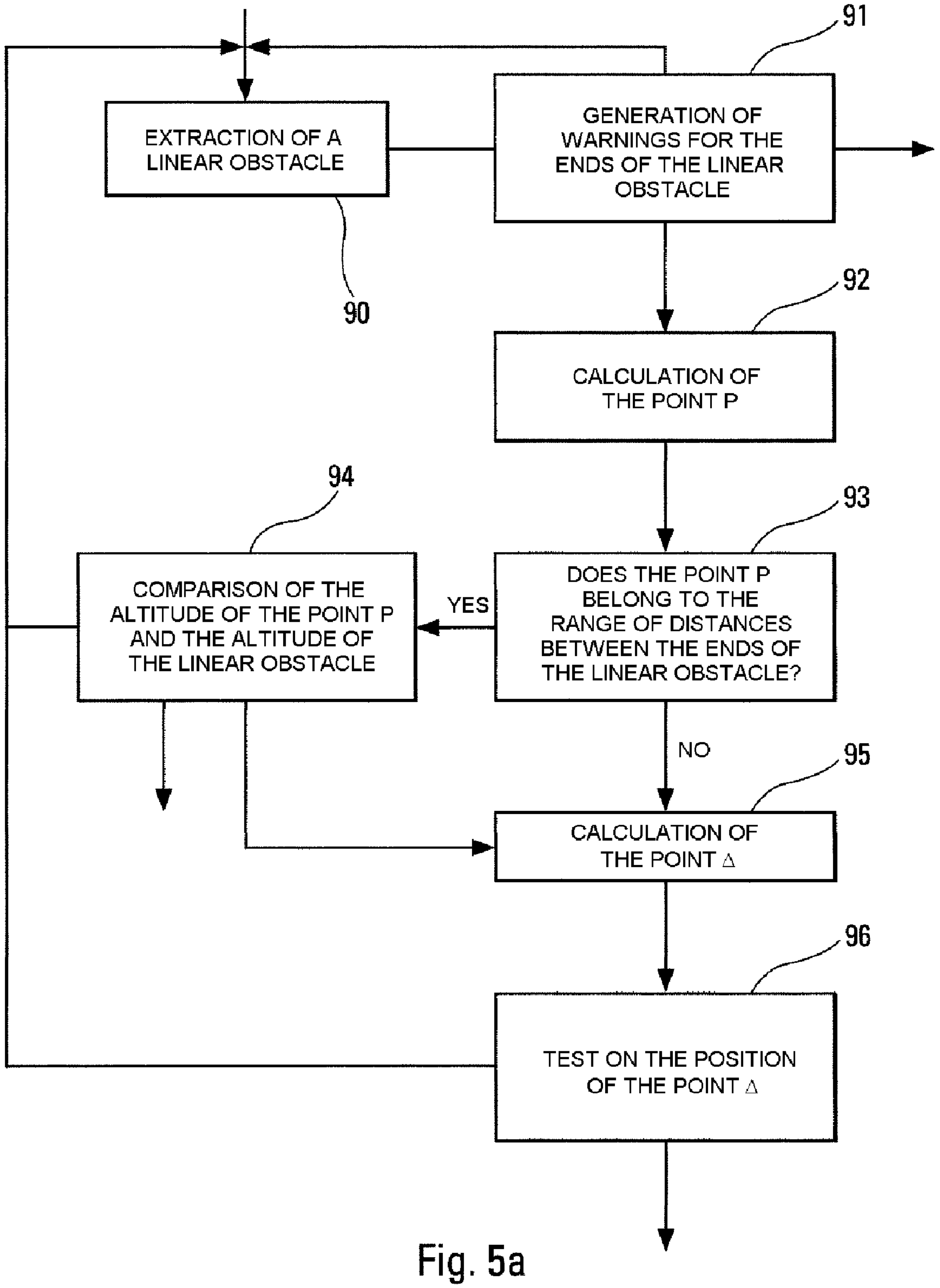
FIG. 5*a*, a method of generating warnings for linear obstacles according to the invention that can be implemented in an obstacle collision prediction and warning device.

FIG. 5*a* shows a method of generating warnings for linear obstacles according to the invention that can be implemented in an obstacle collision prediction and warning device 3. The elements that are identical to elements already presented are given the same references. The method notably receives the predicted path 60 of the aircraft and the list of obstacles 26, that can notably be generated by the method of extracting obstacles according to the invention presented in FIG. 2*a*. In a step 90, the information relating to a linear obstacle is extracted from the list of obstacles 26. If, for a given linear obstacle, a warning is triggered as part of the method of generating warnings for the linear obstacles according to the invention, the method is interrupted to resume at the step 90 on the next linear obstacle present in the list of obstacles 26. Each end of a linear obstacle is notably represented by a pointlike obstacle. All the ends have a height equal to the height of the highest end. Also, the ends are treated in a step 91 in a way similar to the pointlike obstacles by the method of generating warnings for pointlike obstacles according to the invention presented in FIG. 4. As long as there remain linear obstacles in the list of obstacles 26, the method recommences at the step 90.

Figure 5B:
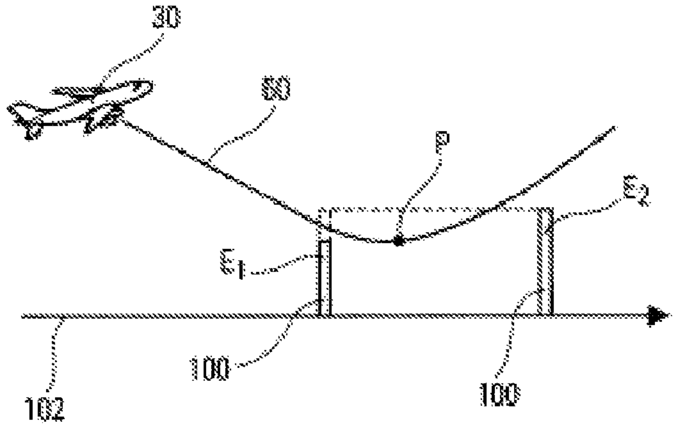
FIG. 5*b*, a case where one of the ends of a linear obstacle triggers the generation of a warning.

FIG. 5*b* is represents a case where one of the ends of a linear obstacle triggers the generation of a warning in the step 91. The elements that are identical to elements already presented are given the same references. A linear obstacle 100 comprising two ends E1 and E2 is represented on an X axis 102 representing a distance. The predicted path 60 of the aircraft notably includes a point P, the altitude of which is less than that of the other points of the predicted path 60 of the aircraft. Since the end E2 has the highest altitude, the end E1 is represented by a pointlike obstacle whose altitude is equal to the altitude of the end E2. Now, according to the method implemented in the step 91, a warning must be triggered.

In FIG. 5*a*, if the step 91 triggers no warning, a step 92 calculates the point P, that is, the point P whose altitude is less than that of the other points of the predicted path 60 of the aircraft. The distance d(P) between the position of the aircraft 30 and the point P is then calculated. The distance between the position of the aircraft 30 and the point whose coordinates are those of the end E1 is denoted d(E1). Similarly, the distance between the position of the aircraft 30 and the point whose coordinates are those of the end E2 is denoted d(E2). In a step 93, a determination is made as to whether the distance d(P) is included in the range [d(E1),d(E2)]. If the distance d(P) is not included in the range [d(E1),d(E2)], the method resumes at a step 95. If the distance d(P) is included in the range [d(E1),d(E2)], in a step 94, the altitude of the predicted path 60 of the aircraft is compared to the distance d(P) and the altitude of the linear obstacle 100. The comparison is used to calculate the warning level that may need to be triggered according to the criteria presented previously. If no warning is triggered, the method resumes at the step 95.

Figure 5C:
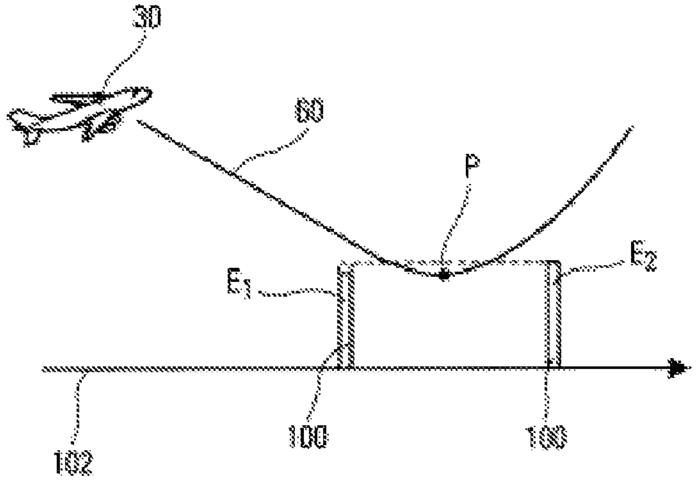
FIG. 5*c*, a case where the profile of the obstacle clearance sensor provokes the generation of a warning.

FIG. 5*c* represents a case where the profile of the predicted path 60 of the aircraft provokes the generation of a warning in the step 94. The elements that are identical to elements already presented are given the same references. The predicted path 60 of the aircraft notably includes a point P whose altitude is less than that of the other points of the predicted path 60 of the aircraft. The distance d(P) is included in the range [d(E1);d(E2)]. Furthermore, the altitude of the point P is less than the altitude of the linear obstacle 100. Now, according to the method implemented in the step 94, a warning must be triggered.

In FIG. 5*a*, if the step 94 does not trigger any warning, a step 95 calculates a point Δ. The point Δ corresponds to the point of intersection between the segment defined by two ends E1 and E2 of the pointlike obstacle 100 and the straight line, passing through the position of the aircraft 30, perpendicular to the segment defined by two ends E1 and E2 of the pointlike obstacle 100. A step 96 checks that:

- the point Δ belongs to the segment defined by two ends E1 and E2 of the pointlike obstacle 100;
- the distance d(P) is included in the range [d(Δ);d(E1)], if d(Δ) represents the distance between the position of the aircraft 30 and the point Δ.

If these two conditions are satisfied, the altitude of the predicted path 60 of the aircraft is compared to the distance d(P) and the altitude of the linear obstacle 100. The comparison is used to calculate the warning level that may need to be triggered according to the criteria presented previously. As long as there remain linear obstacles in the list of obstacles 26, all of the steps described in FIG. 5*a* are recommenced at the step 90.

Figure 5D:
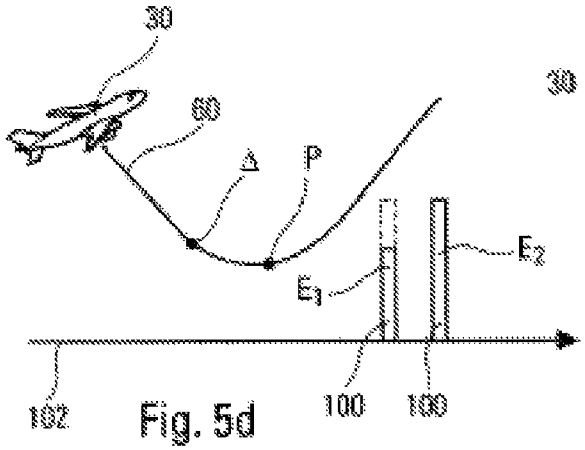
FIG. 5*d*, a case where the profile of the obstacle clearance sensor is more or less perpendicular to a linear obstacle.

FIG. 5*d* represents a case where the profile of the predicted path 60 of the aircraft is more or less perpendicular to a linear obstacle. The elements that are identical to elements already presented are given the same references. The predicted path 60 of the aircraft notably includes the point Δ. The distance d(P) is not included in the range [d(E1);d(E2)].

Figure 5E:
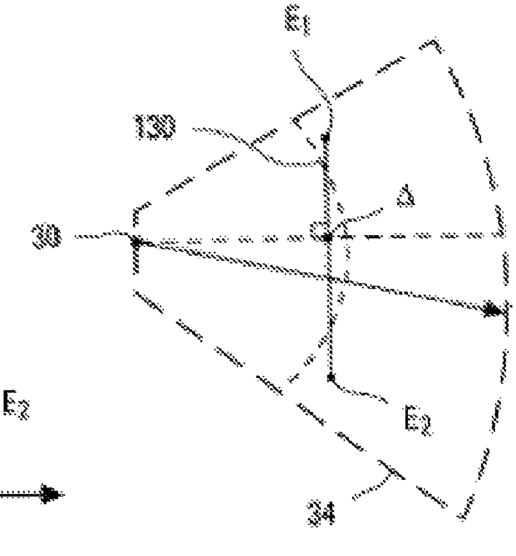
FIG. 5*e*, a top view of the case illustrated by FIG. 5*d*.

FIG. 5*e* represents a top view of the case illustrated by FIG. 5*d*. The elements that are identical to elements already presented are given the same references. The point Δ corresponds to the point of intersection between the segment defined by two ends E1 and E2 of the pointlike obstacle 100 and the straight line, passing through the position of the aircraft 30, perpendicular to the segment defined by two ends E1 and E2 of the pointlike obstacle 100. The point Δ belongs to the segment defined by two ends E1 and E2 of the pointlike obstacle 100 and the distance d(P), represented by a line 130, is included in the range [d(Δ);d(E1)]. Furthermore, the altitude of the predicted path 60 of the aircraft at the distance d(P) is less than the altitude of the linear obstacle 100. Now, according to the method implemented in the step 96, a warning must be triggered.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivilants thereof.

The invention claimed is:

1. A method of predicting collisions with obstacles on the ground and generating warnings, said method implemented by an instrument installed in an aircraft and comprising the following steps:

providing (a) at least one predicted path of the aircraft that represents an altitude of the aircraft and (b) an extraction zone;

extracting, from an obstacle database, a list of pointlike obstacles, the list of pointlike obstacles comprising, for each of the pointlike obstacles, a horizontal distance separating the pointlike obstacle from a current position of the aircraft, horizontal accuracy and a height of the pointlike obstacle;

extracting, from the obstacle database, a list of linear obstacles, the list of linear obstacles comprising, for each of the linear obstacles, a list of pointlike obstacles corresponding to each end of the linear obstacle;

determining, according to the altitude of the aircraft, risks associated with the extracted pointlike obstacles and generating warnings; and determining, according to the altitude of the aircraft, risks associated with the extracted linear obstacles and generating warnings, wherein said step of determining the risks associated with the extracted linear obstacles and generating the warnings includes the following steps of:

processing the ends ($E_1$, $E_2$) of the linear obstacle by the step of determining the risks associated with the extracted pointlike obstacles and generating the warnings;

calculating (a) a point P of the predicted path of the aircraft if no warning is generated in the step of the processing, the altitude of the point P being less than that of the other points of the predicted path of the aircraft, and (b) a distance d(P) between the position of the aircraft and the point P;

calculating a distance $d(E_1)$ between the position of the aircraft and the point P whose coordinates are those of one of the ends ($E_1$) of the linear obstacle;

calculating a distance $d(E_2)$ between the position of the aircraft and the point P whose coordinates are those of another of the ends ($E_2$) of the linear obstacle;

determining that the distance d(P) belongs to the range $[d(E_1),d(E_2)]$:

when the distance d(P) is included in the range $[d(E_1), d(E_2)]$, the method goes on to comparing the altitude of the point and the altitude of the linear obstacle, and then calculating, based on the comparing, a warning level;

when the distance d(P) is not included in the range $[d(E_1),d(E_2)]$, the method is resumed at calculating a point Δ corresponding to the point of an intersection between a segment defined by said two ends ($E_1$, $E_2$) of the linear obstacle and a straight line which passes through the position of the aircraft and is perpendicular to the segment defined by said two ends ($E_1$, $E_2$) of the linear obstacle; and verifying (i) that the point Δ belongs to the segment defined by said two ends ($E_1$, $E_2$) of the pointlike obstacle and (ii) that the distance d(P) belongs to the range $[d(\Delta);d(E_1)]$, $d(\Delta)$ representing the distance between the position of the aircraft and the point.

2. The method as claimed in claim 1, wherein said pointlike obstacle is extracted from the obstacle database on one of the following conditions:

coordinates of said pointlike obstacle are within the extraction zone;

at least a part of an uncertain area of said pointlike obstacle belongs to the extraction zone.

3. The method as claimed in claim 2, further comprising a step of filtering said obstacles to generate a list of obstacles including all the extracted linear and pointlike obstacles on condition that each of said list of obstacles has a height which is higher than a lowest point of the predicted path of the aircraft.

4. The method as claimed in claim 2, wherein said step of determining the risks associated with the extracted pointlike obstacles and generating warnings, for said each pointlike obstacle, further comprises the steps:

extracting information relating to the pointlike obstacle;

calculating a distance d between the current position of the aircraft and a point whose coordinates are those of the pointlike obstacle;

calculating a minimum distance d−ha between the current position of the aircraft and the point whose coordinates are those of the pointlike obstacle notably taking into account the horizontal accuracy;

calculating a maximum distance d+ha between the current position of the aircraft and the point whose coordinates are those of the pointlike obstacle, notably taking into account the horizontal accuracy;

calculating a vertical distance between the pointlike obstacle and each point contained in the predicted path of the aircraft;

calculating, from the vertical distance obtained, a warning level.

5. The method as claimed in claim 1, wherein said linear obstacle is extracted from the obstacle database on one of the following conditions:

the coordinates of each of the ends of said linear obstacle are included in the extraction zone;

said linear obstacle intersects the extraction zone.

6. The method as claimed in claim 5, further comprising a step of filtering said obstacles to generate a list of obstacles including all the extracted linear and pointlike obstacles on condition that each of said list of obstacles has a height which is higher than a lowest point of the predicted path of the aircraft.

7. The method as claimed in claim 5, wherein said step of determining the risks associated with the extracted pointlike obstacles and generating warnings, for said each pointlike obstacle, further comprises:

extracting information relating to the pointlike obstacle;

calculating a distance d between the current position of the aircraft and a point whose coordinates are those of the pointlike obstacle;

calculating a minimum distance d−ha between the current position of the aircraft and the point whose coordinates are those of the pointlike obstacle notably taking into account the horizontal accuracy;

calculating a maximum distance d+ha between the current position of the aircraft and the point whose coordinates are those of the pointlike obstacle, notably taking into account the horizontal accuracy;

calculating a vertical distance between the pointlike obstacle and each point contained in the predicted path of the aircraft;

calculating, from the vertical distance obtained, a warning level.

8. The method as claimed in claim 1, further comprising a step of filtering said obstacles to generate a list of obstacles including all the extracted linear and pointlike obstacles on condition that each of said list of obstacles has a height which is higher than a lowest point of the obstacle clearance.

9. The method as claimed in claim 8, wherein said step of determining the risks associated with the extracted pointlike obstacles and generating warnings, for said each pointlike obstacle, further comprises:

extracting information relating to the pointlike obstacle;

calculating a distance d between the current position of the aircraft and a point whose coordinates are those of the pointlike obstacle;

calculating a minimum distance d−ha between the current position of the aircraft and the point whose coordinates are those of the pointlike obstacle notably taking into account the horizontal accuracy;

calculating a maximum distance d+ha between the current position of the aircraft and the point whose coordinates are those of the pointlike obstacle, notably taking into account the horizontal accuracy;

calculating a vertical distance between the pointlike obstacle and each point contained in the predicted path of the aircraft;

calculating, from the vertical distance obtained, a warning level.

10. The method as claimed in claim 1, wherein said step of determining the risks associated with the extracted pointlike obstacles and generating warnings, for said each pointlike obstacle, further comprises the following steps:

extracting information relating to the pointlike obstacle;

calculating a distance d between the current position of the aircraft and a point whose coordinates are those of the pointlike obstacle;

calculating a minimum distance d−ha between the current position of the aircraft and the point whose coordinates are those of the pointlike obstacle taking into account the horizontal accuracy;

calculating a maximum distance d+ha between the current position of the aircraft and the point whose coordinates are those of the pointlike obstacle, taking into account the horizontal accuracy; and calculating a vertical distance between the pointlike obstacle and each point contained in the predicted path of the aircraft;

calculating, from the vertical distance, a warning level.

11. The method as claimed in claim 1, wherein said step of determining the risks associated with the extracted linear obstacles and generating the warnings further includes if the step of the verifying is positive, comparing the altitude of the point P and the altitude of the linear obstacle, then calculating, based on the comparison, a warning level.

* * * * *